July 26, 1960 G. R. McCLOUD Re. 24,847

LOAD INTERRUPTER FUSE CUTOUT

Original Filed Sept. 29, 1955 3 Sheets-Sheet 1

INVENTOR.
George R. McCloud
BY
Chester W. Brown
ATTORNEY

LOAD INTERRUPTER FUSE CUTOUT

Original Filed Sept. 29, 1955 3 Sheets-Sheet 2

INVENTOR.
George R. McCloud
BY
Chester W. Brown
ATTORNEY

LOAD INTERRUPTER FUSE CUTOUT

Original Filed Sept. 29, 1955 3 Sheets-Sheet 3

INVENTOR.
George R. McCloud
BY
Chester W. Brown
ATTORNEY

United States Patent Office

Re. 24,847
Reissued July 26, 1960

24,847

LOAD INTERRUPTER FUSE CUTOUT

George R. McCloud, Cudahy, Wis., assignor to McGraw-Edison Company, a corporation of Delaware Original No. 2,820,868, dated Jan. 21, 1958, Ser. No. 537,456, Sept. 29, 1955. Application for reissue Oct. 1, 1958, Ser. No. 765,270

12 Claims. (Cl. 200—114)

Matter enclosed in heavy brackets [ ] appears in the original patent but forms no part of this reissue specification; matter printed in italics indicates the additions made by reissue.

This invention relates to new and useful improvements in a load interrupter fuse cutout and more particularly to fuse cutouts wherein provision is made for mechanically breaking the fusible element subject to a load current in an electric circuit.

The usual practice is to provide in an electrical system, a fuse for interrupting a circuit under overload conditions and in series therewith a circuit breaker which may be manually operated to open the circuit operating under normal load conditions.

Theoretically, the fuse can be used as a circuit breaker. However, the fuse contacts are not designed to withstand the destructive effects of arcing when the contacts are separated under load.

The principal object of this invention is to provide a fuse cutout having a fuse link which will interrupt a circuit under overload conditions and including manually operable means for breaking the fuse link when it is desirable to interrupt the circuit under normal loads, thus dispensing with the use of a circuit breaker in series with the fuse cutout and permitting operation of the fuse cutout to open circuit position without producing injurious arcing between the fuse contacts.

It is also an object of this invention to provide a fuse cutout with manually operable fuse link breaking mechanism so arranged that the application of the forces for severing the fuse link react to simultaneously hold the fuse contacts closed during the link breaking operations.

A further object is to provide a fuse cutout in which the link breaking mechanism will serve as means for moving the fuse cutout to open circuit position after the fuse link has been broken and the resulting arc extinguished.

Another object is to provide a housed type fuse cutout wherein the fuse is normally latched in closed position, the link break mechanism is freely manually operable during breaking operations without disturbing the normally latched condition of the fuse, and the link break mechanism engages the fuse after breakage of the fuse link to thereby serve as means for moving the fuse to open circuit position.

Still another object is to provide a housed type fuse cutout in which the door serves as the operating member for the link break mechanism and as the fuse operating member during circuit closing operation prior to fuse link breaking operation and during circuit opening operation subsequent to link breaking operation.

Stating this latter object in another manner, it is the intent that a sequence of door operation be provided wherein first closure of the door places the fuse in the circuit, first, opening of the door renders the link break mechanism operative, second, closing of the door operates the link break mechanism, and third, opening of the door removes the fuse from the circuit.

Other and further objects which are inherent in the invention will become apparent from the disclosure herein.

Figure 1:
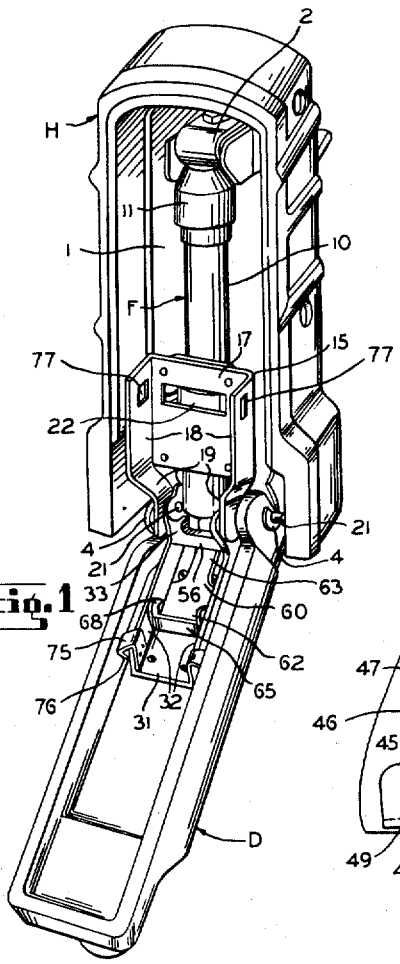
Fig. 1 is a perspective view in front elevation illustrating a housed type fuse cutout with the door in open position.

The embodiment of the invention herein disclosed includes an insulating support comprising a housing H, having an open front and bottom, and a lever comprising a door D, of insulating material, for closing the open front. Mounted on the rear wall 1 of the housing in relatively spaced relation are an upper contact terminal 2 and lower contact terminal 3 which is U-shaped. Adjacent the lower end of the housing is a pair of hook-like bearings 4, one on each side of the housing adjacent a corresponding side wall.

Normally electrically connecting the contact terminal is a fuse cutout F comprising a tube 10 open at its lower end and closed at its upper end by a contact cap 11 frictionally engaged at the top with the upper contact terminal 2. Intermediate the ends of the tube is mounted a contact sleeve 12 secured thereto and having opposed flat sides 13, respectively, frictionally receiving the U-shaped lower contact terminal 3. Integral with the sleeve 12 are mounting ears 14 secured to a first hinge member 15 by means of bolts 16.

The first hinge member 15 comprises a channel-like portion 17 with its sides 18 extending toward the door D and each terminating in downwardly extending hinge arms 19. The lower end of each arm 19 is provided with a portion 20 substantially at right angles thereto and apertured to receive an adjacent hinge pin or trunnion 21 rotatably mounted in the bearings 4. For reasons which will become apparent, the base of the first hinge member 15 is provided with an elongated slot 22.

As indicated in the drawing, the door D is recessed, at 30 within which the hinge member 15 is freely receivable. The door is mounted on a second hinge member 31 which is channel-shaped to provide sides 32 extending from the door and normally positioned between the sides 18 of the first hinge member 15. Each of the sides 32 terminate in an arm 33 substantially at right angles thereto and having an aperture receiving the hinge pin or trunnion 21. Adjacent each of the arms 33 is a segmental pinion 34 rotatable on a corresponding hinge pin 21. The pinions are each provided with segmental arcuate portions 35 terminating at one end in a radial slot 36.

Figure 2:
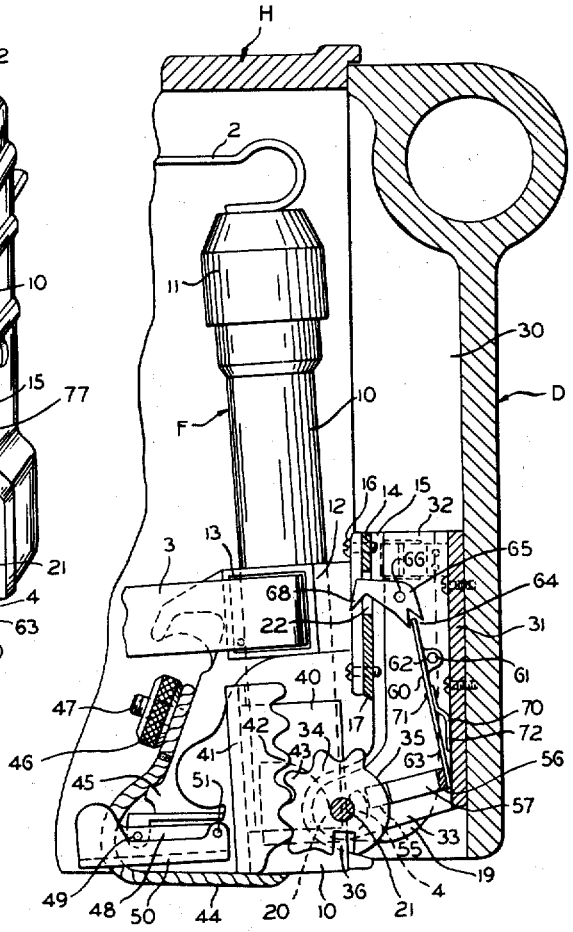
Fig. 2 is a fragmentary view, partly in section, as viewed from the left relative to Fig. 1.

A sleeve 40 is slidably mounted on the fuse tube 10 below the contact sleeve 12. Integral with the sleeve is a gear rack 41 having at opposite sides rack teeth 42 meshing with the pinion gears 43. The rack 41, as shown in Fig. 2, extends to the lower end of the tube 10 where it contacts the flexible end 44 of the fuse link projecting from the tube and extending to the contact arm 45 on the contact sleeve 12 where it is anchored thereto by means of a clamping nut 46 threaded on the stud 47.

The flexible cable 44 is held taut and under some tension by means of an articulated spring biased flipout lever comprising a link 48 hinged at 49 to the arm 45 and an arm 50 hinged to the link at 51. If the fuse link in the fuse tube is ruptured under overload conditions, the spring biased lever pulls the cable from the tube 10 and thus extends the arc. The biased lever is not a necessary combination in the present invention and may be dispensed with, if desired, without impairing the functioning or mode of operation of the invention herein disclosed. However, its use will insure a wide separation of severed sections of the fuse link when ruptured in the manner hereinafter detailed.

The second hinge member 31 is provided with an elongated slot 55 in each of the arms 33 extending in a radial direction relative to the axis of the hinge pins 21. A latching bar 56 extends between the arms 33 and into the slots 55 where it is freely slidable toward the segmental pinions, 34. The bar is U-shaped and has its leg portions 57 disposed to normally bear against the arcuate portions 35 on the segmental pinion 34.

Figure 4:
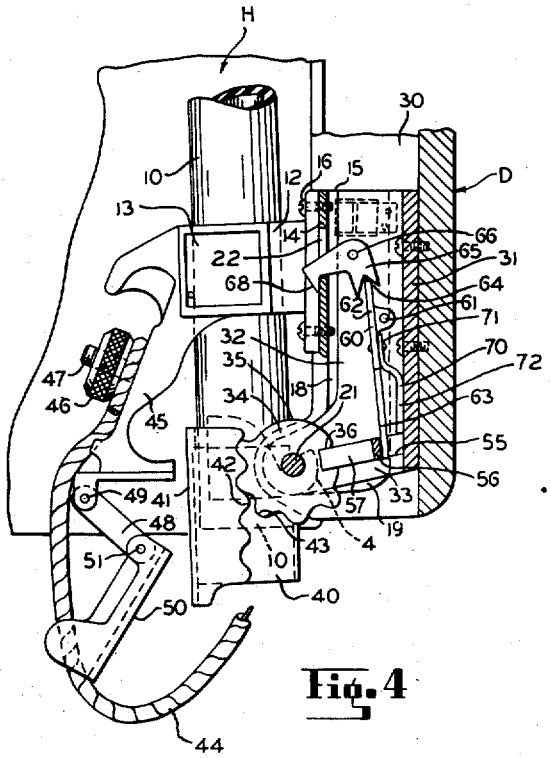
Fig. 4 is a fragmentary view, partly in section, illustrating the relative relationship of the elements after movement of the door from the Fig. 3 position.
Figure 6:
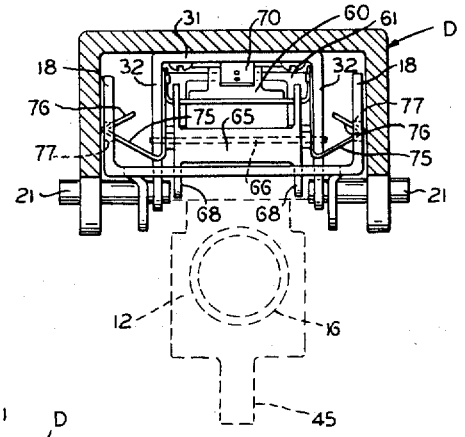
Fig. 6 is a view, partly in section, as seen from above relative to Fig. 5.
Figure 5:
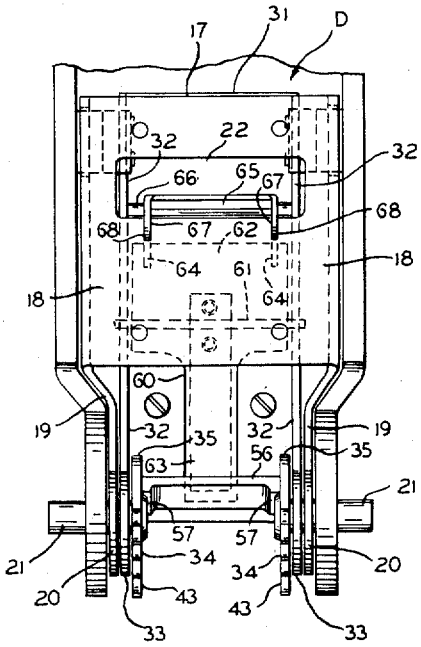
Fig. 5 is a fragmentary view showing portions of the elements as seen from the left relative to Fig. 4.
Figure 7:
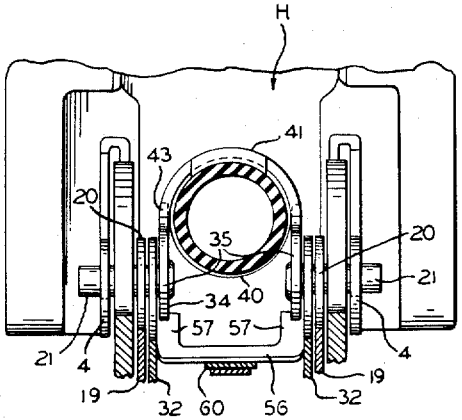
Fig. 7 is a fragmentary view, partly in section, as seen from the right relative to Fig. 4 illustrating the door and fuse in open circuit position.

A biased control lever 60, of the first class, is pivotally mounted at the bar 61 extending between the sides 32 of the hinge element 31. It is T-shaped, as may be seen in Fig. 5 to provide a wide portion 62 at its upper end and a narrow portion 63 at its lower end. The narrow portion 63 of the lever engages the U-shaped latching bar 56, and the wide portion 62 of the lever extends into the inverted V-like slots 64 in the bell crank lever 65 which is pivotally mounted on the bar 66 extending between the sides 32 of the hinge member 31. The bell crank lever 65 is preferably made of sheet metal bent to provide spaced depending sides 67, each having one end provided with the inverted V-like slot 64 and terminating at the other end in a latch hook 68. As indicated in Figs. 2, 4 and 6, the latch hooks 68 extend through the slot 22 in the base portion of the hinge member 15 when the door D is closed.

A leaf strip metal spring 70 is attached at one end to the lever 60 at 71 and its other end 72 bears against the base portion of the hinge member 31. The leaf spring 70 biases the lever 60 in a clockwise direction about its pivot bar 61, thus urging the latching bar 56 into engagement with the segmental pinion 34 and also urging the bell crank 65 in a counter clockwise direction about its pivot bar 66.

The door D is normally held in closed position by means of leaf or strip metal springs 75, each of which is secured to the inner face of an adjacent side 32 on the hinge member 31, is bent over the wall margin and terminates in a V-like bend 76 which extends into a slot 77 in a corresponding side wall 18 on the hinge member 15. The tension of the leaf springs 75 would be sufficient only to hold the door closed but weak enough to permit the door to be manually opened without moving the fuse simultaneously.

When the load interrupter fuse cutout is operating normally, the several elements of the device will be disposed in the relative relationship indicated in Fig. 2. If the fuse F interrupts an overload in the electric circuit, the flipout lever (link 48 and arm 50) will pull the flexible cable 44 from the tube 10 in the manner indicated in Fig. 4. If desired, the sleeve 40 and rack 41 may be biased to slide downwardly when the cable 44 is withdrawn from the tube 10 and thereby rotate the segmental pinions until the biased latching bar 56 engages the pinions in the radial slots 36 as shown in Fig. 4. In such event, the lever 60 will be biased clockwise to engage the latch hooks 68 on the bell crank 65 with lower margin of the slot 22 in the hinge member 15 thereby locking the door D to the fuse F. The door may then be used as a lever for the purpose of rotating the fuse F about the hinge pin axes to remove it from the circuit and to lift it from the hook bearings 4 for placement of a new fuse link in the fuse tube 10.

As indicated in Fig. 2, the latch hooks 68 on the bell crank are normally held out of engagement with the hinge member 15. Consequently, the door D may be manually opened and swung downwardly about the axes of the pivot pins 21. This would be done only when it is desirable to open a circuit which may be operating normally but which should be isolated to permit a lineman to service the electric line for any one of a number of reasons.

Figure 3:
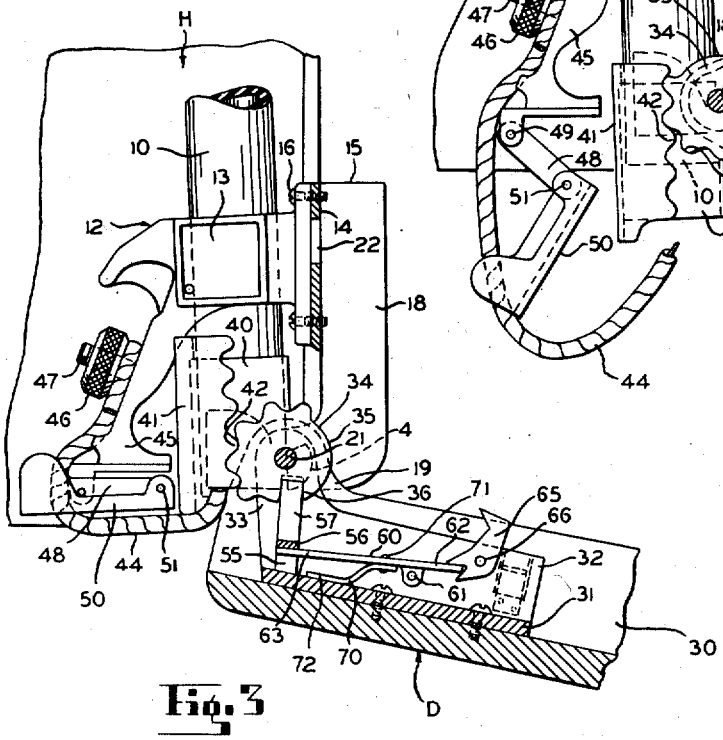
Fig. 3 is a fragmentary view, partly in section, illustrating one position of relative relationship of the elements shown in Fig. 2.

If it is desired to open the circuit, the door D will be moved to the positions shown in Figs. 1 and 3 at which point the latching bar 56 will be engaged in the slots 36 in the segmental pinions 34 by reason of the biasing action of the leaf spring 70. When the door is then returned to its closed position, the segmental pinions 34 will, through the medium of the latching bar 56, be rotated to the position shown in Fig. 4 and will slide the sleeve 40 and rack 41 downwardly on the tube 10 and against the flexible fuse link cable 44 thus setting up sufficient strain on the fusible section of the fuse link to cause it to break and interrupt the electric circuit which is otherwise normally closed through the fuse link. When the fuse link has been severed, the flipout lever (48—50) will operate to pull the flexible cable 44 from the tube, thereby extending the gap produced by the break and extinguishing any arc that might otherwise persist.

As the door D is moved into closed position during the fuse link breaking operation, the bell crank 65, which has been moved to latching or locking position by means of the lever 60 under the bias of the spring 70, will ride over the lower margin of the slot 22 in the hinge member 15 and drop back to engage the latch hooks 68 with the member 15. The fuse F may then be removed from circuit closing position by rotating the door clockwise to a position where the door and fuse may be lifted from the hook-like bearings 4.

After removing the door and fuse, it may be serviced for further use by removing the cable 44 and contact cap 11, inserting a new fuse link to extend the flexible cable out of the open end of the tube 10 and returning the cap to its illustrated position, releasing the segmental pinions 34 by pressing the latching bar 56 against the bias of the spring 70, rotating the pinions 34 to the position shown in Fig. 2 to position the sleeve 40 and rack 41 as shown, and thereafter bringing the flexible leader 44 over the flipout lever and securing it to the arm 45 as previously described. When thus serviced, the door and fuse may then be returned to the housing H by first mounting the pivot pins 21 in the hook-like bearings 4 and rotating the door and fuse to the position indicated in Fig. 1. This, of course, would not be done until the lineman has completed his servicing operations on the electric line.

Fuse link breaking mechanism for fuse cutouts is old in the art but has not been useful in combination with housed type fuse cutouts. Such mechanism defeated the purposes of a housing by exposing electrically live parts, and when operated, would frequently remove the fuse tube from the circuit, which result is not desirable before the fuse link has been broken because of arcing between separating contacts. This result was due primarily to the fact that the forces, utilized to break the fuse link, were applied in such manner as to react in a direction tending to move the fuse tube out of circuit closing position.

In the present case, I have devised a combination wherein the reactive forces produced during fuse link breaking operations are applied in a direction which holds the fuse in circuit closing position. In so doing, I have provided a compact link breaking mechanism which may be embodied in a housed type fuse cutout and which does not expose any electrically live parts.

Although I have disclosed my invention in use with a housed type fuse cutout, it will be readily understood by those skilled in the art, that it may be embodied in an open or unhoused type of fuse cutout without departing from the spirit and scope of the invention. For this reason the claims hereinafter enumerated are not to be limited to a housed type fuse cutout unless specifically so recited.

Furthermore, it will be apparent to those skilled in the art, that the spirit and scope of the invention may be incorporated in various embodiments and, therefore, I do not limit the claims to the specific embodiment herein disclosed unless specifically so recited.

I claim as my invention:

1. A load interrupter fuse cutout comprising in combination, an insulating supporting structure, a pair of terminals mounted on said support in insulated spaced relation, hinge members carried by said support, a fuse tube pivoted at one end on said hinge members and including a pair of spaced contacts normally engaged respectively with said terminals, a fuse link in said tube having a fusible section electrically connecting said contacts and projecting from said tube adjacent the pivoted end thereof, and mechanism engageable with the projecting portion of said fuse link for mechanically rupturing the fusible section of said link, said mechanism comprising an element movable in a longitudinal direction relative to said tube and parallel with the axis of said tube and into stressing engagement with said link, and a manually operable lever interacting with said element to move it in said longitudinal direction and movable about a pivot axis in fixed position relative to said supporting structure, whereby rotative movement of said lever is translated to a linear movement of said element parallel to the axis of said tube.

2. In a fuse cutout structure including an insulating support, a fuse tube pivotally mounted thereon, and a fuse link in said tube having a portion projecting from the pivoted end thereof; fuse link breaking mechanisms comprising in combination a pinion rack slidable on said tube adjacent the projecting end of said fuse link, a pinion engaging said rack and having a latching notch, lever mechanism pivoted coaxially with said pinion, and a biased latch carried by said mechanism engageable in said notch in one direction of rotation thereof about the axis of said pinion, said lever in its normal position paralleling said tube with said latch disengaged from said pinion.

3. In a fuse cutout structure including an insulating support, a fuse tube pivotally mounted thereon, and a fuse link in said tube having a portion projecting from the pivoted end thereof; fuse link breaking mechanisms comprising in combination a pinion rack slidable on said tube adjacent the projecting end of said fuse link, a pinion engaging said rack and having a latching notch, lever mechanism pivoted coaxially with said pinion, and a biased latch carried by said mechanism engageable in said notch in one direction of rotation thereof about the axis of said pinion, said lever in its normal position paralleling said tube with said latch disengaged from said pinion, a second latch carried by said mechanism engageable with said tube when said mechanism is in parallel relation therewith, and interconnecting linkage between the first mentioned latch and second latch whereby when said first mentioned latch is disengaged said second latch is disengaged.

4. In a fuse cutout structure, a fuse tube having a pair of terminal contacts in relatively spaced relationship and a fuse link in said tube electrically connecting said contacts and having a portion extending exteriorly of said tube, in combination with fuse link breaking mechanism comprising a member slidably carried by and longitudinally movable in a parallel direction relative to the axis of said tube and engaged with the said portion of said fuse link, lever means pivotally connected with said tube and motion translating means interposed between said member and lever.

5. In a fuse cutout structure, a fuse tube having a pair of terminal contacts in relatively spaced relationship and a fuse link in said tube electrically connecting said contacts and having a portion extending exteriorly of said tube, in combination with fuse link breaking mechanism comprising a member slidably carried by said tube and engaged with the said portion of said fuse link, lever means pivotally connected with said tube and motion translating means interposed between said member and lever, said motion translating means including a biased latch normally ineffective in one position of said lever and effective in a second position of said lever whereby movement of said lever from said second position to said first position will, through the medium of motion translating means, move said member into stressing engagement with said portion of said fuse link.

6. A load interrupter fuse cutout comprising in combination, an insulating housing having an open front and bottom, a pair of terminals mounted in said housing in spaced relation, hinge members carried by said housing adjacent said bottom, a fuse tube closed at one end by a contact engaging one of said terminals and having a second contact adjacent its other end provided with a trunnion pivoted on said hinge members and engaging the other of said terminals, a fuse link in said tube electrically connecting said contacts and projecting from said other end of said tube and clamped to said second contact, link break mechanism, said link break mechanism comprising a sleeve slidable on said tube adjacent the projecting portion of said fuse link and including a pair of relatively spaced pinion racks in substantial alignment with the axis of said tube, a pair of pinions engaging said racks and pivoted on said trunnions, a door normally closing the front of said housing and having a pair of spaced arms pivoted on said trunnions, a pinion latch carried by said door and biased to engage said pinions when said door is moved to open position, said pinions having corresponding notches for receiving said latch when the door is in open position, and means for interlocking said door and fuse tube upon movement of said door to its closed position after engagement of said latch and pinions.

7. A load interrupter fuse cutout comprising in combination, an insulating housing having an open front and bottom, a pair of terminals mounted in said housing in spaced relation, hinge members carried by said housing adjacent said bottom, a fuse tube closed at one end by a contact engaging one of said terminals and having a second contact adjacent its other end provided with a trunnion pivoted on said hinge members and engaging the other of said terminals, a fuse link in said tube electrically connecting said contacts and projecting from said other end of said tube and clamped to said second contact, link break mechanism, said link break mechanism comprising a sleeve slidable on said tube adjacent the projecting portion of said fuse link and including a pair of relatively spaced pinion racks in substantial alignment with the axis of said tube, a pair of pinions engaging said racks and pivoted on said trunnions, a door normally closing the front of said housing and having a pair of spaced arms pivoted on said trunnions, a pinion latch carried by said door and biased to engage said pinions when said door is moved to open position, said pinions having corresponding notches for receiving said latch when the door is in open position, and means for interlocking said door and fuse tube upon movement of said door to its closed position after engagement of said latch and pinions, said means for interlocking said door and fuse tube include a biased control lever interconnecting said means and pinion latch.

8. In a fuse cutout, in combination, a fuse tube including a pair of relatively spaced terminal contacts exteriorly thereof, a fuse link in said tube interconnecting said contacts and link break mechanism carried by said tube, said mechanism comprising a rack slidable in parallelism with the axis of said tube, a rotatable segmental pinion engaging said rack and having an arcuate portion terminating in a slot, a lever movable about the axis of said pinion in a plane substantially paralleling the axis of said tube, a pinion latch carried by said lever and normally engaging said arcuate portion of said pinion when said lever is in one position in said plane and engageable in said slot when said lever is in a second position in said plane, a second latch carried by said lever and engageable with said tube, and normally disengaged therefrom when said lever is in said one position, a biasing control lever carried by the first mentioned lever and interconnecting said pinion latch and second latch, and a biasing spring engaging said control lever for actuation of said pinion latch and second latch to latching position simultaneously.

*9. In a load interrupter enclosed fuse cutout, the combination of an insulating housing having an open front and bottom and a pair of relatively spaced line terminals therein, and expulsion fuse tube in said housing normally bridging said terminals and having its open end adjacent the open bottom of said housing, a fuse link in said tube electrically connecting said terminals and extending from the open end of said tube, an insulating door, a hinge connecting said door to said housing adjacent the open end of said housing and providing for swinging movement of said door between open and closed positions, means controlled by said door and engaging said fuse link adjacent the open end of said tube for rupturing said fuse link, said means including motion translating means and stressing said link and rupturing said fusible section thereof upon closure of said door, and a hinge connecting said dood and said fuse tube and providing for movement of said door independently of said fuse tube to actuate said fuse rupturing means.*

*10. In a load interrupter housed fuse cutout having a pair of line terminals and a fuse tube and door assembly hingedly connected to said fuse cutout, and wherein said fuse tube includes a pair of relatively spaced contacts engaging said terminals; hinge means connecting said fuse tube to said door and providing for movement of said door independently of said fuse tube, a fuse link in said tube electrically connecting said contacts, and link break mechanism engaging said fuse link and operatively controlled by said door, whereby upon operation of said door independently of said tube said link will be ruptured.*

*11. In a load interrupter housed fuse cutout having a pair of line terminals and a fuse tube and door assembly hingedly connected to said fuse cutout, and wherein said fuse tube includes a pair of relatively spaced contacts engaging said terminals; hinge means connecting said fuse tube to said door and providing for movement of said door independently of said fuse tube, a fuse link in said tube electrically connecting said contacts, and link break mechanism engaging said fuse link and operatively controlled by said door, whereby upon operation of said door independently of said fuse tube said link will be ruptured.*

*12. An enclosed fuse cutout comprising an insulating housing, movable closure means for said housing, first and second electrical terminal means within said housing, fuse means for said cutout including fuse link means for electrically bridging said first and second electrical terminal means, hinge means connecting said closure means and said fuse means and providing for independent movement of said closure means relative to said fuse means, and link break means engaging said fuse link and operatively associated with and controlled by said closure means, said closure means actuating said link break means to forcibly part said fuse link upon operation thereof independently of said fuse means.*

References Cited in the file of this patent or the original patent

UNITED STATES PATENTS

| | | |
|---|---|---|
| 2,269,130 | Schultz | Jan. 6, 1942 |
| 2,310,466 | Schultz et al. | Feb. 9, 1943 |
| 2,514,163 | Pittman | July 4, 1950 |
| 2,625,623 | Baskerville | Jan. 13, 1953 |
| 2,672,539 | Steinmayer | Mar. 16, 1954 |
| 2,735,911 | Sant | Feb. 21, 1956 |
| 2,737,551 | Curtis et al. | May 6, 1956 |
| 2,829,218 | Harder | Apr. 1, 1958 |
| 2,843,704 | Wood | July 15, 1958 |